INVENTOR.
FRANK E. COUPLAND

United States Patent Office 3,526,929
Patented Sept. 8, 1970

3,526,929
APPARATUS FOR MINIMIZING TERMINAL DROOL IN INTERMITTENT-CHARGE PLASTIC EXTRUSION APPARATUS
Frank E. Coupland, Blackwood, N.J., assignor to Shell Oil Company, New York, N.Y., a corporation of Delaware
Filed Nov. 24, 1967, Ser. No. 685,400
Int. Cl. B29d 23/04
U.S. Cl. 18—14                      7 Claims

ABSTRACT OF THE DISCLOSURE

This application discloses a method and apparatus for minimizing terminal drool in intermittent-charge plastic extrusion apparatus, especially in valve-controlled intermittent-charge plastic extrusion apparatus for producing tubular parisons and blown hollow articles from compressible plastic material, such for example as polyolefins and particularly polyethylene.

BACKGROUND OF THE INVENTION

It is now a common practice to produce molded articles, especially hollow articles such as bottles and the like, by intermittently forcing a charge of plastic material out through a nozzle or die opening to form a self-suspended blank, workpiece, or parison and to enclose and subsequently form the parison into an article in a divided multi-part mold, expanding the parison, when tubular, by filling it with pressure fluid to cause it to take the shape of the mold chamber.

The patent of Crosio 2,887,716, May 26, 1959, shows a machine of the intermittent-charge ram extrusion type. The patent of Sanko 2,980,955, Apr. 25, 1961, shows a screw type extrusion machine having a charge cut-off valve. The apparatus to be disclosed herein has both a charge- extruding ram and a cut-off valve.

Some plastic materials, such as polyolefins for example, are highly compressible in their plastic condition, usually when heated to a relatively high temperature to make them flowable in a viscous molten condition for extrusion and molding; and when a charge has been compressed to the very high pressures required—up to eight or ten thousand p.s.i. or more—to form a parison there will remain in the confined space behond the nozzle or die, a column of material under very high pressure. Since this confined compressed material is highly expansive and since the nozzle or die space remains open the material will continue to flow out of the die opening but at increasingly lower pressures to form an attenuated terminal length of parison material which has come to be known as parison "drool." This terminal or drool portion of the parison will have a smaller cross section than the main body portion of the parison for the reason that the re-expanded cross-sectional area of the parison after clearing the die orifice varies somewhat in proportion to the extrusion pressure. As an illustration, the wall thickness of the main body of a tubular parison formed at 8000 p.s.i. in a die of 0.015" wall space may be as much as 0.040" wall thickness—about triple—with some corresponding increase in overall tube diameter; whereas the terminal or parison drool portion which is forced out of the die by expansion of the retained column of material behind the die will have a much smaller wall thickness and overall diameter due to smaller re-expansion at diminishing outflow pressure and to some extent due to smaller die orifice at lower pressure as related to the expansibility of the components of the die itself. There is some accompanying shortening or "snap-back" of the parison to be considered for some purposes.

This parison drool of attenuated cross section causes much trouble, particularly in the case of hollow articles where it is located where the mouth of the article is to be formed in the mold, because it tends to produce imperfections in this zone; additionally, it forces more of the lower and more perfect portion of the parison down through the mold zone so that more of the lower end will be nipped off and lost as scrap when the mold closes. This assumes, as is usually required for proper operation, that the length of the extruding action and the volume of the charge extruded will be set up for a given length of perfect parison outflow from the die orifice and that the mold will take off all parison material which is exposed below the lower end of the die. If there should be an arrangement which would cause the drool portion of material to be located at some other portion of the article, the consequences could be as bad or worse. If material is forced out of the die after the mold has closed it will form a mass on the upper end of the article which requires later removal and which may cause articles to stick together.

The present invention overcomes the trouble caused by terminal drool of an extruded charge by immediately relieving the pressure in the column of confined material retained behind the die. When the extruding action ends, as when an extruding ram reaches the forward end of its stroke, and before there is time for more material at lower pressure to be forced through the die by expansion of retained material, the pressure in the terminal column of material is relieved behind the die so that there will be substantially no after-flow of material to form an attenuated drool portion of a parison or other body.

One form of apparatus for relieving pressure in the terminal column after a charge has been extruded, as when the ram reaches the forward end of its charge-extruding stroke, comprises means forming an auxiliary expansion space or chamber into which material can flow, there being an auxiliary ram for the expansion chamber to force material back into the column of material for the next charge extruding action.

Another form comprises such an expansion chamber having an auxiliary ram operated by the same means as that which operates a cut-off valve which closes after the extruding action ceases and opens before the next extruding action begins.

Another form comprises means forming a side bleed-off or waste passage together with means for opening it when the extruding action ceases and for closing it before the next extruding action begins. One convenient form of such bleed-off means comprises an escape slot or channel formed on the cut-off valve which is opened when the valve closes and closed when the valve opens. This involves some loss of material but it is recoverable reusable material.

Another form comprises means for causing the extruding instrumentalities, such as ram or screw or both, to perform a limited reverse action as soon as the forward extruding action has been completed whereby to provide rearward pressure relief. This may be largely a matter of relative timing of the extruding means and the cut-off valve when that is provided, the valve being closed after the relief has been provided but before the completion of the next charge intake action by the extruding means.

DRAWINGS

The invention will be described in connection with certain embodiments of apparatus shown in the accompanying drawings, wherein.

SPECIFIC EMBODIMENTS

Figure 1:
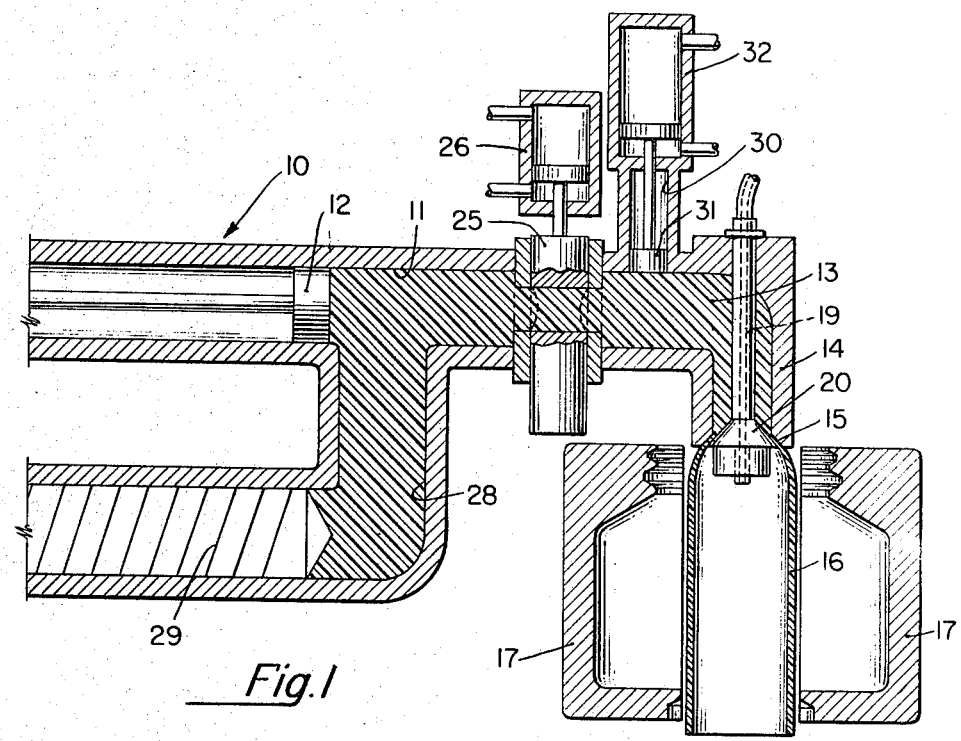
FIG. 1 is a diagrammatic sectional view of one form of intermittent action ram-extruded valve-controlled parison forming and blow molding apparatus embodying the invention, the parts being shown in the position in which a charge has been extruded to form a parison.
Figure 2:
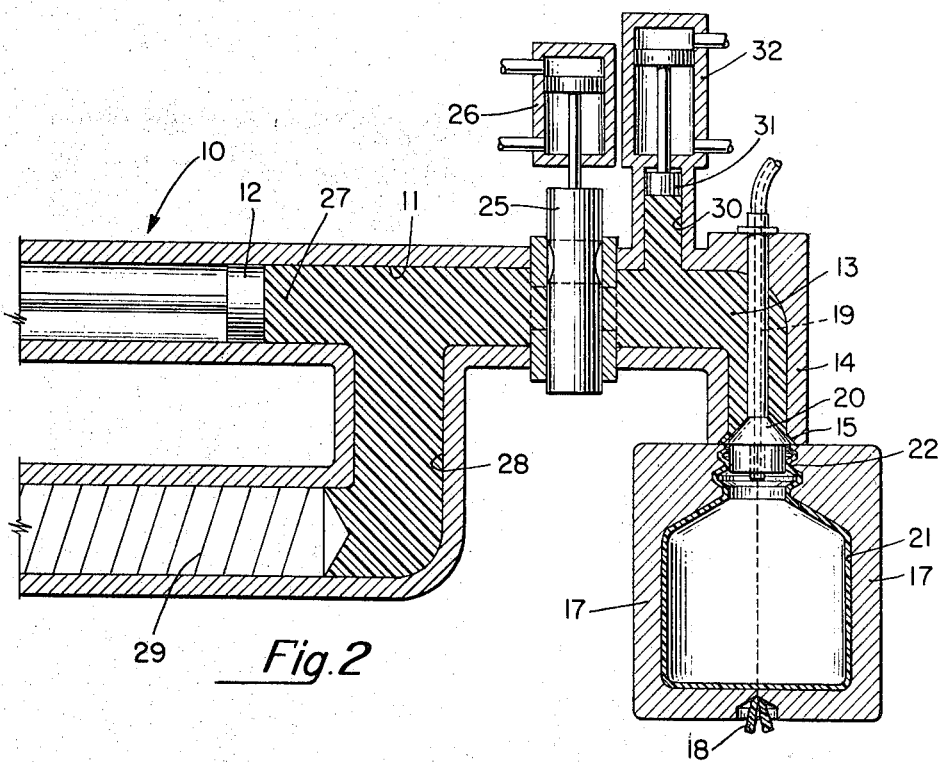
FIG. 2 is a view like FIG. 1 but showing the position of parts after an article has been formed.

Referring first to the embodiment shown in FIGS. 1 and 2, there is a heavy-walled channelled casing 10 having a main compression passage 11 in the rear portion of which a power-actuated compression extrusion ram 12 reciprocates under controlled timing to force a column of plastic material 13 forward through a downturned passage 14 and out through the annular orifice of a die unit 15 to form a tubular blank, workpiece or parison 16 (FIG. 1). A divided multi-part mold 17 embraces the parison position and later closes on the parison in preparation for forming a hollow article, the mold nipping off a lower end portion 18 of the parison when closing to form the lower closed end of the article, as shown in FIG. 2.

A conduit or tube 19 extends through the core 20 of the die for supplying fluid under pressure for inflating the parison to cause it to fill the chamber of the mold and form a hollow article 21. Means are provided for adjusting the die elements to vary the size of the outlet orifice. The neck 22 of the article is disposed where the inner or terminal end of the parison was located and if there is an attenuated drool portion here the neck of the article may have malformation.

A cut-off valve 25 is provided beyond the front end position of the ram 12 and the valve is operated, as by a power device 26, here a fluid actuated cylinder-piston unit, with suitable timing controls to cause the valve to close as soon as the ram has reached the forward end of its stroke and conditions are proper and to open before the next extruding action begins.

After the valve 25 closes the ram 12 fully retracts, as shown in FIG. 2, and the rear ram passage or accumulator chamber 27 is refilled with plastic material, as through a side passage 28 by a supply means, such as a plasticating screw 29.

While the valve is closed the mold will be closed, the article formed, the mold re-opened, and the article removed, ready for the formation of the next parison.

Atfer the end of each compression action, here when the ram reaches the forward end of its stroke and the valve closes, there will remain behind the die orifice a column of material under high pressure and when the material is compressible and re-expansible there will be a considerable amount of material forced by expansion out through the die opening before the mold closes, forming the attenuated terminal end parison drool portion referred to above.

In order to minimize this after-flow drool portion to eliminate its harmful effects, the present invention provides for relieving the pressure in the terminal confined column of material behind the die orifice as soon as possible after the compression action has been completed. This pressure relief may be attained by various means, some forms of which are disclosed herein.

In the first form, still referring to FIGS. 1 and 2, there is provided in or connected with the casing 10 a relief space or chamber 30 provided with an auxiliary compression ram 31 operated by power means 32, such as a cylinder-piston device, having suitable timing controls to cause the ram 31 to retract as soon as the compression action has been completed. This may be timed to provide relief before, during, or after the cut-off valve has been closed, depending on preferred operation.

When the cut-off valve is re-opened and before the end of the next compressing action, the relief chamber is re-closed and the material therein forced back into the main column of material.

Figure 3:
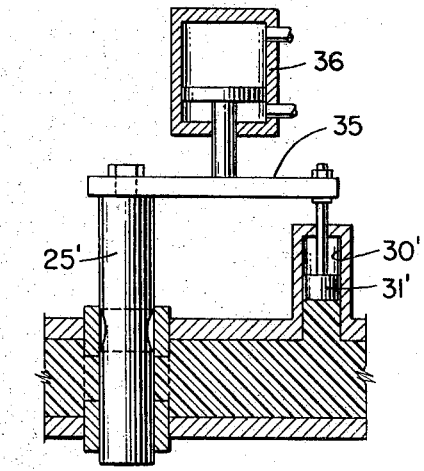
FIG. 3 is a view similar to a portion of FIG. 1 but showing an auxiliary side-relief ram operated with the cut-off valve.

The form shown in FIG. 3 is similar to that of FIGS. 1 and 2 except that the auxiliary compression ram 31' in the relief chamber 30' is operated conjointly and concurrently with the cut-off valve 25', as by a connecting bar 35 and a timed power device 36, here a timed cylinder-piston device.

Figure 4:
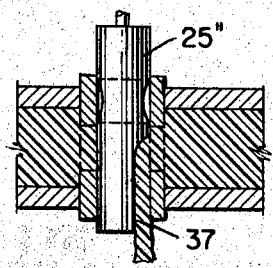
FIG. 4 is a partial view of a cut-off valve provided with a pressure relief bleed-off passage.

The form shown in FIG. 4 provides relief by allowing some of the material to escape from the system as temporary but re-usable waste, here the cut-off valve 25" being provided with a slot or groove 37 toward its lower end which opens to relief when the valve closes and closes off from relief when the valve opens. Since the relief slot is located on the side of the valve toward the die and away from the compression ram it will provide pressure relief for the confined column of expansible material behind the die without affecting the action of the main compression extrusion ram in receiving a new charge of material from the side intake supply which enters the accumulator chamber.

Figure 5:
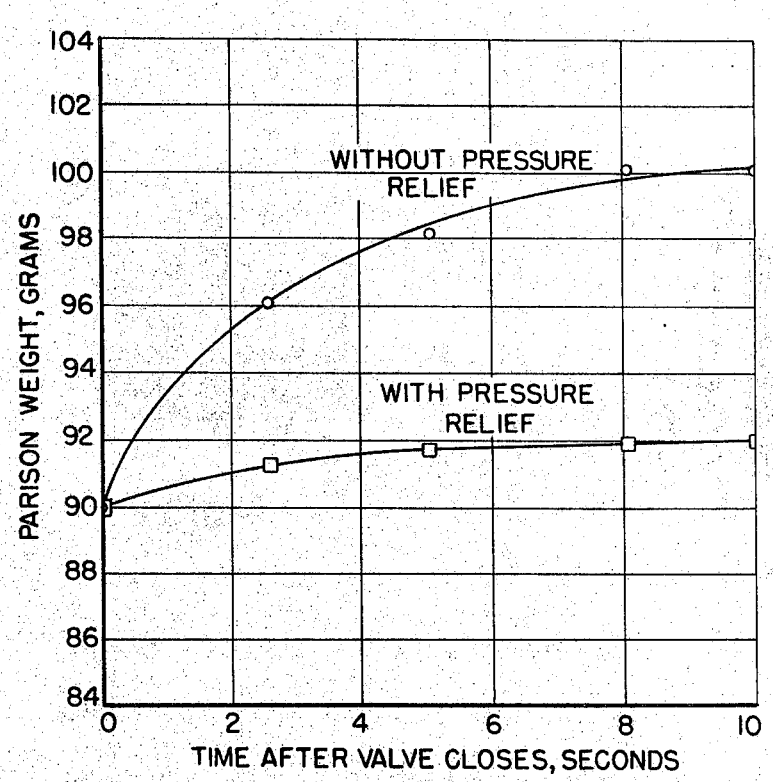
FIG. 5 is a diagram showing the effects produced by pressure relief as compared to comparable effects produced without pressure relief.

Tests which have been conducted show that there is considerable improvement in the extruded blank, particularly in a self-suspended tubular parison body for blow-mold forming of a hollow article with a neck, when the present invention is applied. Using polyethylene (Shell HB2423 of 0.96 density and 0.3 melt index) at 360° F. and a ram pressure of 8000 p.s.i. and the slotted valve of FIG. 4, the parison drool was reduced to about one-fifth of the amount produced without pressure relief, using a normal cut-off valve without a relief slot. FIG. 5 shows the change in parison weight with time after the valve closed for the normal and modified valves. The chart with its legends is largely self-explanatory in showing that there is far less after-flow or parison drool when pressure relief is provided, the lower curve, than when it is not provided, the upper curve.

One gallon milk bottles were molded using both a normal cut-off valve and a slotted valve and varying the time of mold closure from 0 to 6 seconds after valve closure. At each of several intervals in the range it was found that neck flanges of bottles were considerably thicker when pressure relief was used than when it was not used, showing clearly that the after-flow attenuation or drool caused undesirable conditions in the article which were largely avoided by relieving pressure after the compression action according to the present invention.

When the slotted cut-off valve was used there was some loss of material as temporary scrap but this was not great and no doubt could be reduced by adjustment of slot size to operating conditions. As stated, the material is re-usable.

The mold shown herein by way of example is a simple one in which a single hollow article is formed with the small open end disposed uppermost. There may be arrangements in which the open end is disposed lowermost; in which multi-enlargements are formed; and other variations known in the art. The prevention of terminal after-flow of material, according to the present invention, will improve molding conditions in all such forms as well as in the form illustrated where parison drool causes imperfections in the top neck of the article or leaves excess hot plastic material on the upper end of the neck of the article.

While certain embodiments of the invention have been described for purposes of illustration, it is to be understood that there may be other modifications and embodiments within the general scope of the invention.

What is claimed is:

1. Apparatus for forming an extruded plastic body with minimal expansion after-flow from compressible re-expansible plastic material, comprising in combination, conduit means enclosing a terminal column of plastic material moving to a terminal orifice, compression means for extruding a charge of material in said column through said orifice, a cut-off valve for closing said terminal column downstream from said compression means after the compression action has been completed, and means for relieving pressure in the downstream portion of said terminal column between said cut-off valve and said orifice, after said compression means has completed its compressive action, and for minimizing after-flow of material from said orifice by expansion of compressed material in said downstream portion.

2. Apparatus for forming an extruded plastic body as set forth in claim 1, wherein said means for relieving pressure in said downstream portion of said terminal column comprises means forming a material outflow relief space, and means for opening said relief space to said column of material after said compression means has completed its charge extruding action.

3. Apparatus for forming an extruded plastic body as set forth in claim 2, wherein said means for opening said relief space comprises auxiliary compression means which returns material from the relief space back to the material of the terminal column for a subsequent compression extruding action.

4. Apparatus for forming an extruded plastic body as set forth in claim 2, which comprises means actuated concurrently with said cut-off valve for opening said relief space to said terminal column when the valve closes and for closing the relief space when the valve opens.

5. Apparatus for forming an extruded plastic body with minimal expansion after-flow from compressible re-expansible plastic material, comprising in combination, conduit means enclosing a terminal column of plastic material moving to a terminal orifice, compression means for extruding a charge of material in said column through said orifice, and a cut-off valve for closing said terminal column downstream from said compression means after the compression action has been completed and which is provided with a relief groove which opens to the downstream portion of said column when the valve closes and closes when the valve opens, and for minimizing after-flow of material from said orifice by expansion of compressed material in the portion of said column between said valve and said orifice.

6. Apparatus for forming an extruded plastic body with minimal expansion after-flow from compressible re-expansible plastic material, comprising in combination, conduit means enclosing a terminal column of plastic material moving to a terminal orifice, compression means for extruding a charge of material in said column through said orifice, a cut-off valve for closing said terminal column ahead of said compression means after the compression action has been completed, and means for relieving pressure in the downstream portion of said terminal column between said cut-off valve and said orifice, comprising a material outflow relief space and a ram operating in said relief space, connected for operation with said cut-off valve to open said relief space to said downstream portion of said terminal column after said compression means has completed its charge extruding action, and to return material from said relief space back to the material of the terminal column for a subsequent compression extruding action.

7. Apparatus for forming a suspended tubular parison body within a multipart mold, comprising in combination, conduit means enclosing a terminal column of plastic material moving to a terminal parison-forming orifice, compression means for extruding a charge of material in said column through said orifice, said compression means comprising a reciprocatory ram moving through a side-supplied accumulator chamber, a cut-off valve disposed in said terminal column space downstream from the forward end position of said ram, means on the downstream side of said valve forming a relief space to said terminal column enclosing means, and means for opening said relief space when the ram reaches the forward end of its stroke and for closing it before the ram moves forward on the compression stroke, and for minimizing terminal attenuation of the parison body by after-flow of material from said orifice by expansion of material in the portion of said terminal column of material downstream from said cut-off valve.

References Cited

UNITED STATES PATENTS

| 2,887,716 | 5/1959 | Crosio | 18—5 |
| 3,054,143 | 9/1962 | Stenger | 18—14 |
| 3,089,192 | 5/1963 | Adams | 18—5 X |
| 3,127,637 | 4/1964 | Rex | 18—5 X |
| 3,217,360 | 11/1965 | Mason et al. | 18—14 |
| 3,259,944 | 7/1966 | McIlvin. | |

FOREIGN PATENTS

| 1,476,753 | 3/1967 | France. |

J. SPENCER OVERHOLSER, Primary Examiner

M. O. SUTTON, Assistant Examiner

U.S. Cl. X.R.

18—5, 30